United States Patent
Abraham et al.

(10) Patent No.: US 9,788,264 B2
(45) Date of Patent: Oct. 10, 2017

(54) BLOOM FILTER FOR SERVICE HINT INFORMATION IN ADVERTISEMENTS

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/861,325

(22) Filed: Sep. 22, 2015

(65) Prior Publication Data

US 2016/0112936 A1    Apr. 21, 2016

Related U.S. Application Data

(60) Provisional application No. 62/065,001, filed on Oct. 17, 2014.

(51) Int. Cl.
*H04W 48/16* (2009.01)
*H04L 1/00* (2006.01)

(52) U.S. Cl.
CPC ........... *H04W 48/16* (2013.01); *H04L 1/0061* (2013.01)

(58) Field of Classification Search
None
See application file for complete search history.

(56) References Cited

U.S. PATENT DOCUMENTS

| | | | |
|---|---|---|---|
| 2007/0071015 A1* | 3/2007 | Wang | H04L 69/22 370/401 |
| 2008/0291875 A1* | 11/2008 | Kang | H04W 36/0061 370/331 |
| 2010/0135289 A1* | 6/2010 | Bowes | H04L 1/0072 370/389 |
| 2014/0211659 A1 | 7/2014 | Abraham et al. | |

(Continued)

OTHER PUBLICATIONS

International Search Report and Written Opinion—PCT/US2015/051641—ISA/EPO—Dec. 16, 2015.

(Continued)

*Primary Examiner* — Chi H Pham
*Assistant Examiner* — Shick Hom
(74) *Attorney, Agent, or Firm* — Patterson & Sheridan, LLP

(57) ABSTRACT

Certain aspects of the present disclosure generally relate to using bloom filter hash functions for service hint information in advertisements such as beacons and probe responses. Certain aspects provide an apparatus for wireless communications, such as an access point (AP). The apparatus generally includes a processing system configured to generate a plurality of bitmaps that indicate one or more services known by the apparatus, each bitmap being generated by applying a different set of one or more cyclic redundancy check (CRC) based hash functions to one or more service identifications (IDs) of each service, and to generate one or more frames, each frame including one of the plurality of bitmaps and an indication of the set of one or more CRC based hash functions used to generate the bitmap included in the frame, and an interface configured to output the one or more frames for transmission.

20 Claims, 7 Drawing Sheets

(56) References Cited

U.S. PATENT DOCUMENTS

2014/0219159 A1* 8/2014 Wang ................ H04W 72/005
                                                    370/312
2014/0254479 A1   9/2014 Abraham et al.

OTHER PUBLICATIONS

Yong S.K., et al., "Generic Service Discovery Proposal: Dynamic Bloom Filter Operation; 11-14-0877-02-00aq-generic-service-discovery-proposal-dynamic-bloom-filter-operation", IEEE Draft, 11-14-0877-02-00AQ-Generic-Service-Discovery-Proposal-Dynamic-Bloom-Filter-Operation, IEEE-SA Mentor, Piscataway, NJ, USA, vol. 802.11aq, No. 2, Jul. 17, 2014 (Jul. 17, 2014), pp. 1-15, XP068070603, [retrieved on Jul. 17, 2014] Slide 8.

* cited by examiner

| | | | | |
|---|---|---|---|---|
| 402 | 404 | 406 | 408 | |
| Element ID | Length | Bloom Filter Information | M-bit Service Hint Map | |
| octets: 1 | 1 | 1 | variable | |

| | | |
|---|---|---|
| | 410 | 412 |
| | Bloom Filter Hash Set Index | Reserved |
| octets: | 0-1 | 2-7 |

BLOOM FILTER FOR SERVICE HINT INFORMATION IN ADVERTISEMENTS

CROSS-REFERENCE TO RELATED APPLICATION(S)

This application claims benefit of U.S. Provisional Patent Application Ser. No. 62/065,001, filed Oct. 17, 2014, which is herein incorporated by reference in its entirety.

BACKGROUND

Field of the Disclosure

Certain aspects of the present disclosure generally relate to wireless communications and, more particularly, to using bloom filter hash functions for service hint information in advertisements such as beacons and probe responses.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to using bloom filter hash functions for service hint information in advertisements such as beacons and probe responses.

Certain aspects of the present disclosure provide an apparatus for wireless communications. The apparatus generally includes a processing system configured to generate a plurality of bitmaps that indicate one or more services known by the apparatus, each bitmap being generated by applying a different set of one or more cyclic redundancy check (CRC) based hash functions to one or more service identifications (IDs) of each service and generate one or more frames, each frame including one of the plurality of bitmaps and an indication of the set of one or more CRC based hash functions used to generate the bitmap included in the frame, and an interface configured to output the one or more frames for transmission.

Certain aspects of the present disclosure provide an apparatus for wireless communications. The apparatus generally includes an interface configured to obtain a frame from another apparatus, the frame including a bitmap that indicates one or more services known by the other apparatus and an indication of a set of one or more CRC based hash functions used to generate the bitmap included in the frame, and a processing system configured to: determine bitmap locations by applying the indicated set of one or more CRC based hash functions to one or more service IDs of services desired by the apparatus, compare the determined bitmap locations and bitmap locations of the bitmap included in the frame, and associate with the other apparatus if the comparison indicates a probability that a service desired by the apparatus is known by the other apparatus or refrain from associating with the other apparatus if the comparison indicates the one or more services are not known by the other apparatus.

Certain aspects of the present disclosure provide a method for wireless communications by an apparatus. The method generally includes generating a plurality of bitmaps that indicate one or more services known by the apparatus, each bitmap being generated by applying a different set of one or more CRC based hash functions to one or more service IDs of each service, generating one or more frames, each frame including one of the plurality of bitmaps and an indication of the set of one or more CRC based hash functions used to generate the bitmap included in the frame, and outputting the one or more frames for transmission.

Certain aspects of the present disclosure provide a method for wireless communications by an apparatus. The method generally includes obtaining a frame from another apparatus, the frame including a bitmap that indicates one or more services known by the other apparatus and an indication of a set of one or more CRC based hash functions used to generate the bitmap included in the frame, determining bitmap locations by applying the indicated set of one or more CRC based hash functions to one or more service IDs of services desired by the apparatus, comparing the determined bitmap locations and bitmap locations of the bitmap included in the frame, and associating with the other apparatus if the comparison indicates a probability that a service desired by the apparatus is known by the other apparatus or refraining from associating with the other apparatus if the comparison indicates the one or more services are not known by the other apparatus.

Certain aspects of the present disclosure provide an apparatus for wireless communications. The apparatus generally includes means for generating a plurality of bitmaps that indicate one or more services known by the apparatus, each bitmap being generated by applying a different set of one or more CRC based hash functions to one or more service IDs of each service, means for generating one or more frames, each frame including one of the plurality of bitmaps and an indication of the set of one or more CRC based hash functions used to generate the bitmap included in the frame, and means for outputting the one or more frames for transmission.

Certain aspects of the present disclosure provide an apparatus for wireless communications. The apparatus generally includes means for obtaining a frame from another apparatus, the frame including a bitmap that indicates one or more services known by the other apparatus and an indication of a set of one or more CRC based hash functions used to generate the bitmap included in the frame, means for determining bitmap locations by applying the indicated set of one or more CRC based hash functions to one or more service IDs of services desired by the apparatus, means for comparing the determined bitmap locations and bitmap locations of the bitmap included in the frame, and means for associating with the other apparatus if the comparison indicates a probability that a service desired by the apparatus is known by the other apparatus or refraining from associating with the other apparatus if the comparison indicates the one or more services are not known by the other apparatus.

Certain aspects of the present disclosure provide a computer readable medium. The computer readable medium generally includes computer executable code stored thereon for generating, at an apparatus, a plurality of bitmaps that indicate one or more services known by the apparatus, each bitmap generated by applying a different set of one or more CRC based hash functions to service IDs of each service, generating one or more frames, each frame including one of the plurality of bitmaps and an indication of the set of one or more CRC based hash functions used to generate the bitmap included in the frame, and outputting the one or more frames for transmission.

Certain aspects of the present disclosure provide a computer readable medium. The computer readable medium generally includes computer executable code stored thereon for obtaining a frame from another apparatus, the frame including a bitmap that indicates one or more services known by the other apparatus and an indication of a set of one or more CRC based hash functions used to generate the bitmap included in the frame, determining bitmap locations by applying the indicated set of one or more CRC based hash functions to one or more service IDs of services desired by the apparatus, comparing the determined bitmap locations and bitmap locations of the bitmap included in the frame, and associating with the other apparatus if the comparison indicates a probability that a service desired by the apparatus is known by the other apparatus or refraining from associating with the other apparatus if the comparison indicates the one or more services are not known by the other apparatus.

Certain aspects of the present disclosure provide an access point (AP). The AP generally includes at least one antenna, a processing system configured to generate a plurality of bitmaps that indicate one or more services known by the AP, each bitmap being generated by applying a different set of one or more CRC based hash functions to one or more service IDs of each service, and generate one or more frames, each frame including one of the plurality of bitmaps and an indication of the set of one or more CRC based hash functions used to generate the bitmap included in the frame, and a transmitter configured to transmit the one or more frames via the at least one antenna Certain aspects of the present disclosure provide an access terminal. The access terminal generally includes at least one antenna, a receiver configured to receive, via the at least one antenna, a frame from an AP, the frame including a bitmap that indicates one or more services known by the AP and an indication of a set of one or more CRC based hash functions used to generate the bitmap included in the frame, and a processing system configured to: apply the indicated set of one or more CRC based hash functions to one or more service IDs of services desired by the access terminal to determine bitmap locations, and associate with the AP if the comparison indicates a probability that a service desired by the access terminal is known by the AP or refrain from associating with the AP if the comparison indicates the one or more services are not known by the AP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
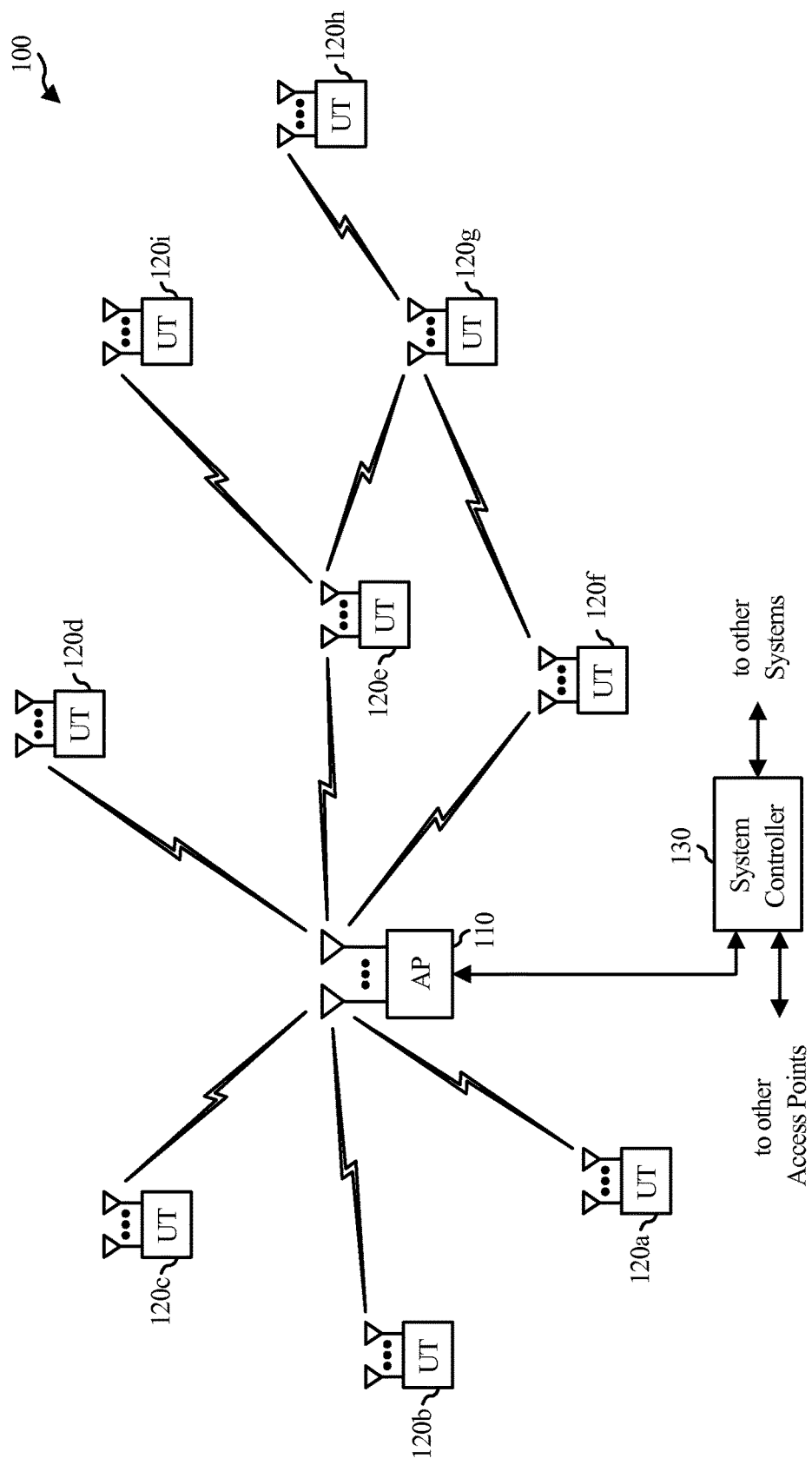
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Certain aspects of the present disclosure generally relate to using bloom filter hash functions for service hint information in advertisements such as beacons and probe responses. An access point (AP) may generate a plurality of different bitmaps indicating services known by the AP by applying different sets of hash functions (e.g., CRC32 hash functions) to service identifications (IDs) of each service. The AP may transmit the bitmap to stations (STAs) along with an indication of the set of hash functions used to generate the bitmap. An STA that receives the frame may apply the set of hash functions to a service ID(s) of service(s) desired by the STA to compute bitmap locations. By comparing the computed bitmap locations to the bitmap in the frame received from the AP, the STA may determine whether there is a high likelihood that the desired service is available and may decide whether to associate with the AP based on the determination. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

AN EXAMPLE WIRELESS COMMUNICATION SYSTEM

FIG. 1 illustrates a system 100 in which aspects of the disclosure may be performed. For example, an access point 110 may use a bloom filter to provide service hint information in advertisements. A user terminal 120 may receive the service hint information and determine whether to associate with the access point 110 based on the available services.

System 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also use a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
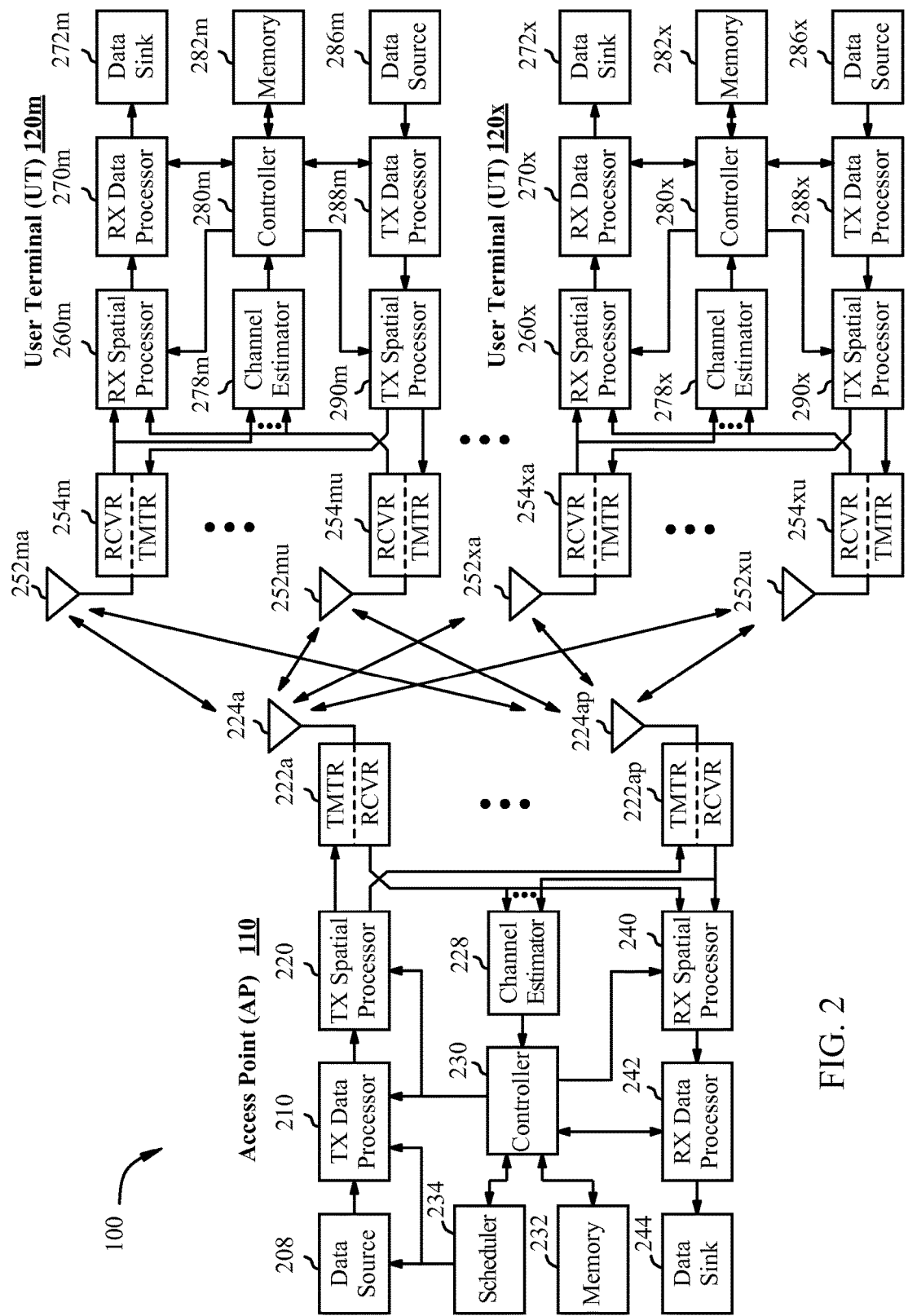
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 5-5A. Similarly, antenna 252, Tx/Rx 254, processors 260, 270, 288, and 290, and/or controller 280 of the UT 120 may be used to perform the operations described herein and illustrated with reference to FIGS. 6-6A.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix Hdn,m for that user terminal Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
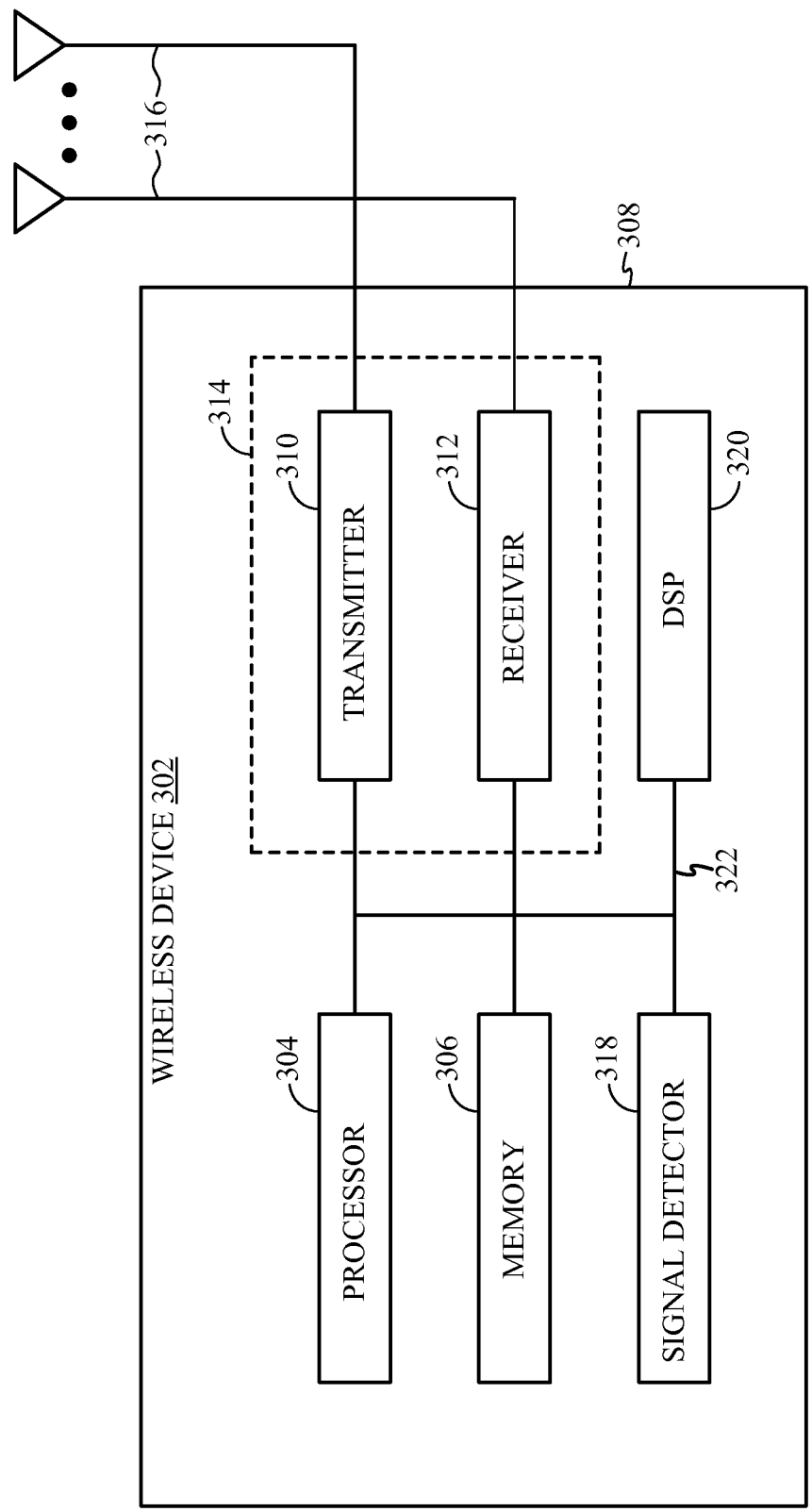
FIG. 3 illustrates a block diagram of an example wireless device, in accordance with certain aspects of the present disclosure.

FIG. 3 illustrates example components that may be utilized in the AP 110 and/or UT 120 to implement aspects of the present disclosure. For example, the transmitter 310, antenna(s) 316, processor 304 and/or the DSP 320 may be used to practice aspects of the present disclosure implemented by the AP. Further, the receiver 312, antenna(s) 316, processor 304 and/or the DSP 320 may be used to practice aspects of the present disclosure implemented by the UT.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

A UE may become aware of APs by performing scanning procedures as specified in the Institute of Electrical and Electronic Engineers (IEEE) specification IEEE 802.11, which generally includes passive scanning and active scanning. Passive scanning, e.g. as defined in IEEE 802.11, may be inefficient for the UE, as it waits, with receiver on, for the reception of a AP beacon. As the beacon transmission interval is on the order of a hundred milliseconds, this may result in high scan energy and high scan latency with dozens of channels to scan. Active scanning may be faster but adds traffic to the network, e.g. probe requests and probe responses. Active scanning is also power intensive.

IEEE 802.11u has defined additional mechanisms for a UE to discover further information about an AP without being associated with the AP. For example, a generic advertisement service (GAS) may transport an advertisement protocol's frames between the UE and a server in the network. The AP may be responsible for relaying a mobile device's query to a server in the carrier's network and for delivering the server's response back to the mobile. Another exemplary mechanism for a UE to discover information about an AP without being associated with the AP is a service discovery protocol, e.g. the access network query protocol (ANQP) in case of Wi-Fi, which is generally a query advertisement protocol for access network information retrieval by the UE/STA. ANQP may be transported over GAS in the case of Wi-Fi. ANQP may include a Hotspot operator's domain name, roaming partners accessible via the Hotspot along with their credential type and extensible authentication protocol (EAP) method supported for authentication, IP address type availability, and other metadata useful in the UE's network selection process.

IEEE 802.11aq extends some of the mechanism of IEEE 802.11u to enable Pre-Association Discovery (PAD) of services provided by an AP.

EXAMPLE BLOOM FILTER FOR SERVICE HINT INFORMATION IN ADVERTISEMENTS

Interworking generally refers to the ability for a wireless device (e.g., a Wi-Fi device) to learn about services provided in a network prior to joining. One mechanism that may enable interworking is Pre-Association Discovery (PAD) of services.

PAD allows a station, such as an access terminal (AT) (e.g., AT 250) to discover service information regarding services offered by a network, for example, by an access point (AP) (e.g., AP 210) in the network before associating with the AP. APs can indicate available services, for example, in an advertisement such as a beacon, probe response, or generic advertisement service (GAS) that is transmitted to STAs or broadcast. STAs may determine to associate with an AP based on whether a desired service is known by the AP, for example, offered/supported by the AP or another STA, which the STA may know based on the information received in the advertisement from the AP.

Typically, service information may be provided according to solicited or unsolicited PAD protocol. In unsolicited PAD protocol, basic service information may be included in the beacons and/or broadcast frames transmitted by the AP (e.g., a PADP Service Announcement). Upon receiving the beacons and/or broadcast frames, the non-AP STAs can make an informed decision to associate with the AP, or query for more detailed service information before association (e.g., by sending a PADP Service Information Request and receiving a PADP Service Information Response).

In solicited PAD protocol, basic service information may be included in the probe request transmitted by the non-AP STA. For example, the probe request may include a Service Hash element containing one or more Service Hashes. A Service Hash may be a Short Identifier (48 bits) of a Unique Service Identifier (USID) that globally uniquely identifies a service. Upon receiving the probe request, the AP responds with a probe response only if there is a service match between services included in the probe request by the non-AP STA and services supported by the AP (e.g., by comparing hashes). Based on whether the non-AP STA receives a probe response or upon receiving the probe response, the non-AP STAs can make an informed decision to associate with the AP or query for more detailed service information before association (e.g., by sending a PADP Service Information Request and receiving a PADP Service Information Response).

However, due the growing number of available services, simply carrying the service names in an advertisement (e.g., a beacon, probe response, broadcast frame, or GAS) may not be scalable. Accordingly, a compressed method for indicating a potentially large number of available services may be desirable.

Techniques and apparatus described herein provide for a service hint information element (IE) that is scalable. According to certain aspects, the hint IE carries a bloom filter with service identifiers (IDs) indicated as bit positions, for example, in a bitmap, and a bloom filter IE that indicates a set of hash functions (e.g., CRC32 hash functions) used to generate the bitmap.

According to certain aspects, an AP may generate a plurality of different bitmaps indicating services offered by the AP by applying different sets of hash functions to service IDs of each service. The AP may transmit the bitmap to STA) along with an indication of the set of hash functions used to generate the bitmap.

A STA that receives the frame may apply the set of hash functions to a service ID(s) of service(s) desired by the STA to compute bitmap locations. By comparing the computed bitmap locations to the bitmap in the frame received from the AP, the STA may determine whether there is a high likelihood that the desired service is offered by the AP and may decide whether to associate with the AP based on the determination.

A service may be identified by an identifier, such as a unique service identifier (USID). The service ID may be compressed by using a hash function or a set of hash functions to compute a hash value of the service ID. According to certain aspects, service hint information including the hashed service IDs of services available at the AP may be included in a service information IE provided in advertisements such as beacons, broadcast frames, GAS frames, and/or probe responses.

Figures 4, 4A, 4B:
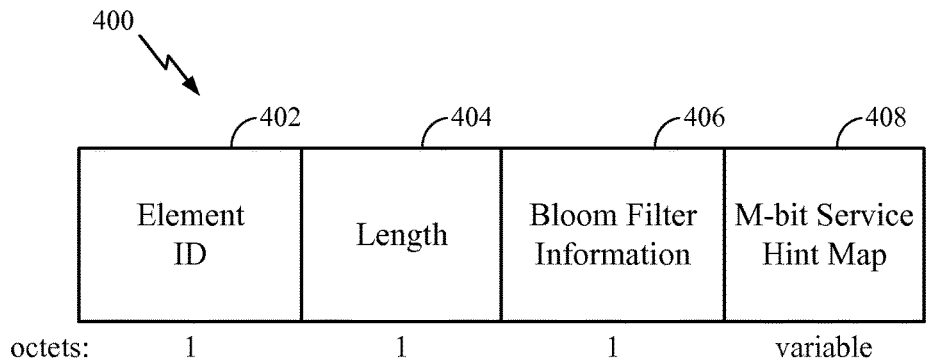
FIG. 4 illustrates example frame format for service hint information element (IE), in accordance with certain aspects of the present disclosure.
FIG. 4A illustrates example sets of bloom filter hash functions that may be indicated in a field of the service hint IE, in accordance with certain aspects of the present disclosure.
FIG. 4B illustrates example bloom filter information field subfields of the example service hint information IE shown in FIG. 5, in accordance with certain aspects of the present disclosure.

FIG. 4 illustrates an example frame format for a service hint IE 400 that may be included in an advertisement frame, in accordance with certain aspects of the present disclosure. As shown in FIG. 4, the service hint IE 400 may include an element ID field 402, a length field 404, a bloom filter information field 406, and a variable length m-bit service hint map field 408.

According to certain aspects, the m-bit service hint map field 408 may include a bitmap representing available service. According to certain aspects, the hash function used to hash the available service IDs may be a bloom filter hash function. Each service ID may be hashed to four bit positions in the m-bit service hint map field 408 using a set of hash functions (e.g., a set of four hash functions).

The set of hash functions may be, for example, any of the set of hash functions shown in Table 400A illustrated in FIG. 4A. Although Table 400A shows four groups of four bloom filter hash functions which may be used to hash service IEs, the service hint IE may indicate any number of bloom hash functions which may be used to hash the service IEs.

The notation $H(j,X,m)$ denotes a hash function, where j denotes a bloom filter hash function pre-pend parameter used in the computation that may range from 0x00 to 0x0F (hex notation), where X denotes the service hash to be indicated in the bloom filter, and where m denotes a size of the bloom filter to be indicated in bits. In one example implementation, the hash function $H(j,X,m)$ for service hash X using a bloom filter of length m-bits with pre-pend parameter j may be computed using the following equations:

$$A(j,X)=[j\|X], \quad\quad (Eq.\ 1)$$

where ∥ denotes an append operation.

$$B(j,X)=CRC32(A(j,X))\ \&\ 0x0000FFFF \quad\quad (Eq.\ 2)$$

to obtain the last two bytes of the 32 bit CRC of $A(j,X)$, where the CRC operation is seeded with 0xFFFFFFFF.

$$H(j,X,m)=B(j,X)\bmod m \quad\quad (Eq.\ 3)$$

FIG. 4B illustrates example subfields of the bloom filter information field 406 of the example service hint information IE 400, in accordance with certain aspects of the present disclosure. According to certain aspects, the bloom filter information field 406 may include an indication of the set of hash functions, for example the Bloom Filter Set Index from Table 1, that was used to generate the bitmap carried in the m-bit service hint map field 408.

As shown in FIG. 4B, the bloom filter information field 406 may also include the bloom filter hash set index subfield 410 that indicates the index of the set of hash functions used. Referring to Table 1, for example, 00 for set 1, 01 for set 2, 10 for set 3, or 11 for set 4 may be indicated. However, the bloom filter hash set index may indicate any combination of hash functions that was used to hash the service IDs.

In an example implementation, to indicate a service hash X, the value of the set of hash functions corresponding to the bloom filter set index indicated in the bloom filter information field 406 may be computed. The bit positions computed for each of the indicated hash functions may be made equal to one in the bitmap carried in the m-bit service hint map field 408.

Figure 5:
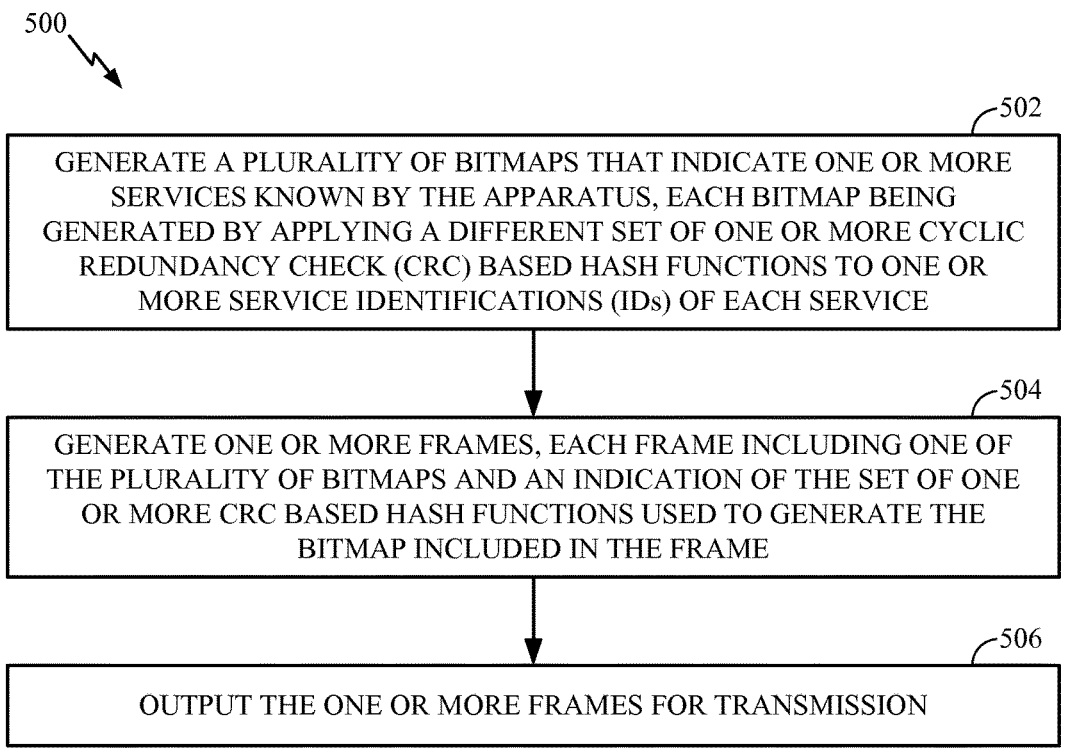
FIG. 5 illustrates a block diagram of example operations for wireless communications by an access point (AP), in accordance with certain aspects of the present disclosure.
Figure 5A:
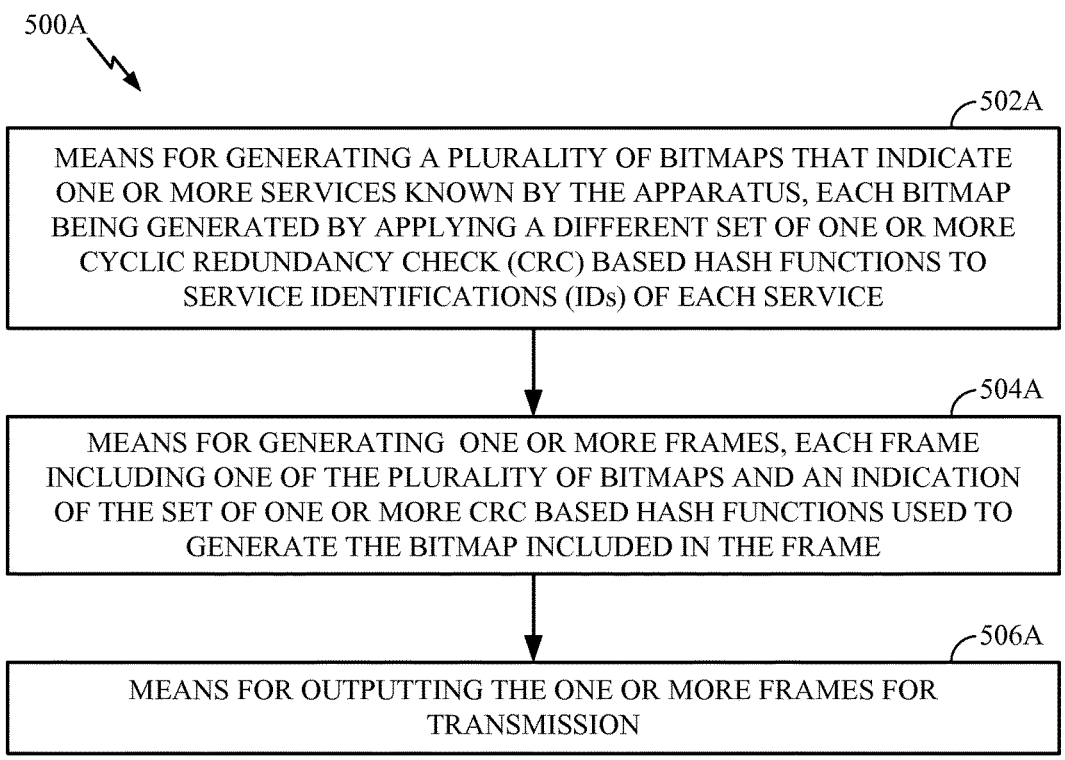
FIG. 5A illustrates example means capable of performing the operations shown in FIG. 5.

FIG. 5 illustrates a block diagram of example operations 500 for wireless communications, in accordance with certain aspects of the present disclosure. The operations 500 may be performed, for example, by an access point (e.g., AP 110). The operations 500 begin, at 502, by generating a plurality of bitmaps that indicate one or more services known by the apparatus, each bitmap being generated by applying a different set of one or more CRC based hash functions (e.g., CRC32 hash functions) to one or more service identifications (IDs) of each service.

At 504, the AP generates one or more frames (e.g., a beacon frame, broadcast frame, GAS frame, or probe response frame), each frame including one of the plurality of bitmaps and an indication of the set of one or more CRC based hash functions used to generate the bitmap included in the frame.

According to certain aspects, the number of bits used for the bitmaps, the number of the sets of CRC based hash functions, or the number of CRC based hash functions in each set may be selected based on a desired probability of providing a false positive indication that the AP provides a particular service. According to certain aspects, the AP may cycle through different ones of the plurality of bitmaps when generating frames. The AP may select the bitmap to include in the frame based on an analysis of all of the plurality of bitmaps. For example, the AP may analyze a distribution of locations with bits set in the bitmaps, which may help reduce having bit locations set that indicate a service that is not actually provided.

At 506, the AP outputs the one or more frames for transmission (e.g., as part of a PAD protocol).

Figure 6:
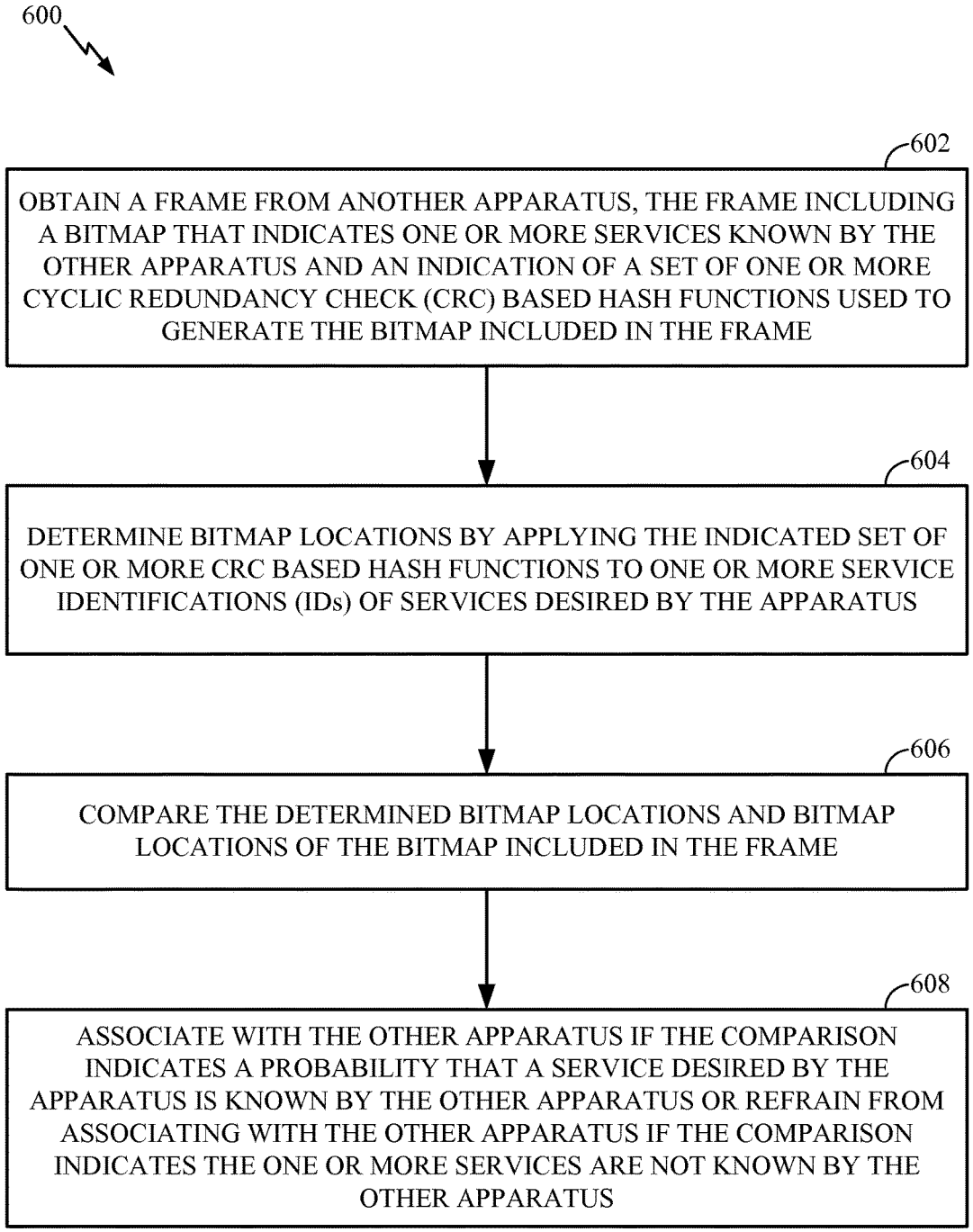
FIG. 6 illustrates a block diagram of example operations for wireless communications by a station (STA), in accordance with certain aspects of the present disclosure.
Figure 6A:
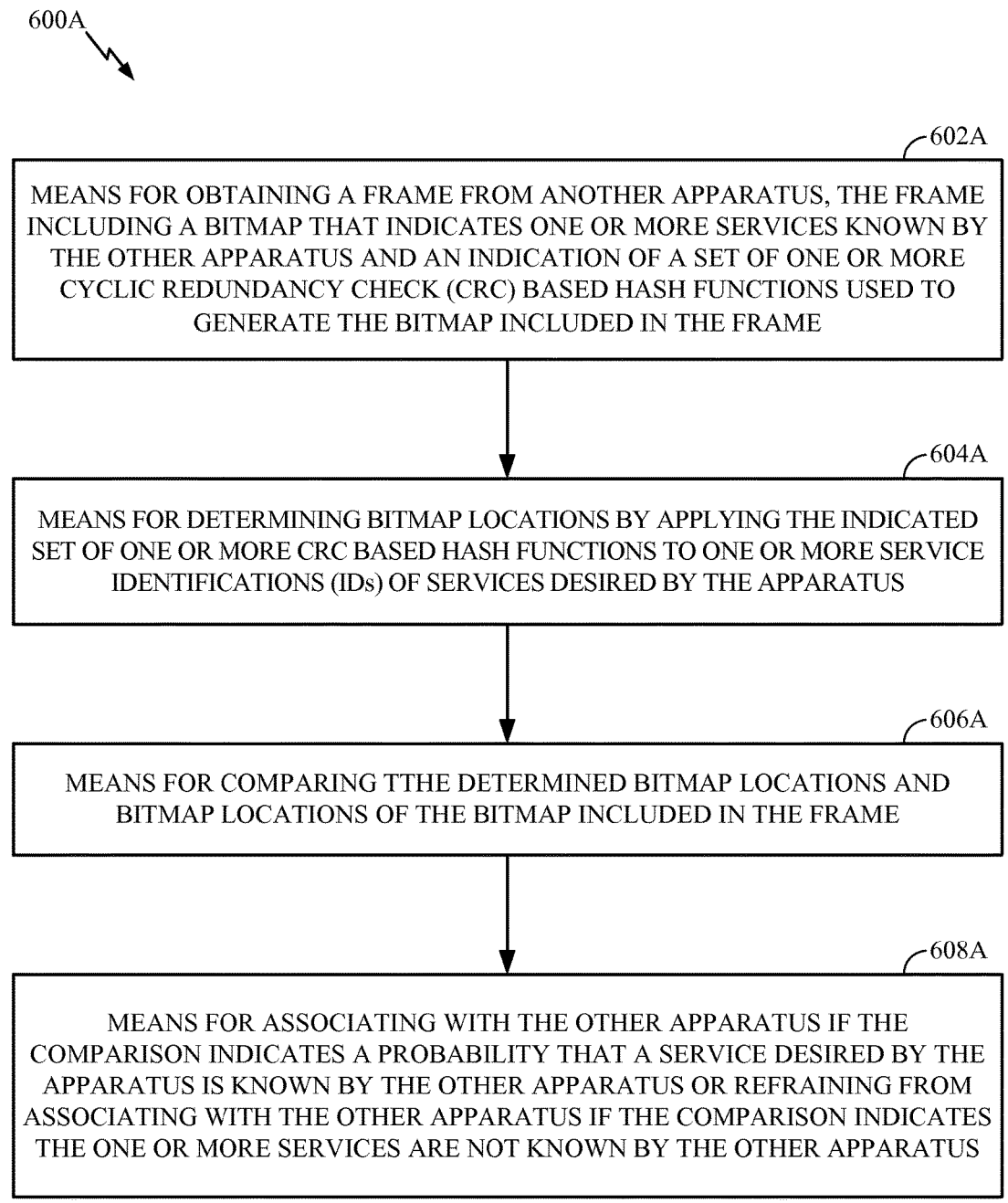
FIG. 6A illustrates example means capable of performing the operations shown in FIG. 6.

FIG. 6 illustrates a block diagram of example operations 600 for wireless communications, in accordance with certain aspects of the present disclosure. The operations 600 may be performed, for example, by an access terminal (e.g., user terminal 120). In other words, operations 600 may be performed by a STA receiving an advertisement frame transmitted in accordance with operations 500 described above.

The operations 600 begin, at 602, by obtaining (e.g., as part of a PAD protocol) a frame (e.g., a beacon frame, management frame, GAS frame, or probe response frame) from another apparatus (e.g., an AP), the frame including a bitmap that indicates one or more services known by the other apparatus and an indication of a set of one or more CRC based hash functions (e.g., CRC32 hash functions) used to generate the bitmap included in the frame At 604, the AT determines bitmap locations by applying the indicated set of one or more CRC based hash functions to one or more service identifications (IDs) of services desired by the AT.

At 606, the AT compares the determined bitmap locations and bitmap locations of the bitmap included in the frame. At 608, the AT may associate with the other apparatus if the comparison indicates a probability that a service desired by the apparatus is known by the other apparatus or refrain from associating with the other apparatus if the comparison indicates the one or more services are not known by the other apparatus.

According to certain aspects, the techniques described above for using a bloom filter to indicate service hint information in advertisements may provide a compressed format for a network to indicate a large number of supported services to non-AP STAs, such that the non-AP STA can determine whether to associate with an AP based on whether a service described by the non-AP STA is supported by the network.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A.

For example, means for transmitting may comprise a transmitter (e.g., the transmitter unit(s) 222*a*-222*ap*) and/or an antenna(s) 224*a*-224*ap* of the access point 110 illustrated in FIG. 2, the transmitter (e.g., the transmitter unit(s) 254*m*-254*mu*) and/or an antenna(s) 252 of the user terminal 120*m* illustrated in FIG. 2 through the transmitter (e.g., the transmitter unit(s) 254*xa*-254*xu*) and/or an antenna(s) 254*xa*-254*xu* of the user terminal 120*x* illustrated in FIG. 2, and/or the receiver 312 of the transceiver 314 of the wireless device 302 illustrated in FIG. 3. Means for receiving may comprise a receiver (e.g., the receiver unit(s) 222a-222ap) and/or an antenna(s) 224a-224ap of the access point 110 illustrated in FIG. 2, a receiver (e.g., the receiver unit(s) 254m-254mu) and/or an antenna(s) 252ma-252mu of the user terminal 120m illustrated in FIG. 2 through a receiver (e.g., the receiver unit(s) 254xa-254xu) and/or an antenna(s) 252xa-252xu of the user terminal 120x illustrated in FIG. 2, and/or the transmitter 310 of the transceiver 314 of the wireless device 302 illustrated in FIG. 3.

Means for processing, means for determining, means for obtaining, means for outputting, means for deciding, means for generating, means for comparing, means for selecting, and/or means for analyzing may comprise a processing system, which may include one or more processors, such as the TX spatial processor 220, the RX spatial processor 240, the RX data processor 242, the TX data processor 210, scheduler 234, and/or controller 230, the TX MIMO processor 230 of the access point 110 illustrated in FIG. 2, the RX spatial processor 260m, the RX data processor 270m, TX data processor 288m, the TX spatial processor 290m, and/or the controller 280m of the user terminal 120m illustrated in FIG. 2 through the RX spatial processor 260x, the RX data processor 270x, TX data processor 288x, the TX spatial processor 290x, and/or the controller 280x of the user terminal 120x illustrated in FIG. 2; and/or the processor 304 of the wireless device 302 illustrated in FIG. 3.

According to certain aspects, such means may be implemented by processing systems configured to perform the corresponding functions by implementing various algorithms (e.g., in hardware or by executing software instructions) described above for using a bloom filter to provide service hint information in advertisements. For example, an algorithm for generating a plurality of bitmaps that indicate one or more services known by the apparatus, each bitmap being generated by applying a different set of one or more CRC based hash functions to one or more service IDs of each service, an algorithm for generating one or more frames, each frame including one of the plurality of bitmaps and an indication of the set of one or more CRC based hash functions used to generate the bitmap included in the frame, and an algorithm for outputting the one or more frames for transmission. As another example, an algorithm for obtaining a frame from another apparatus, the frame including a bitmap that indicates one or more services known by the other apparatus and an indication of a set of one or more CRC based hash functions used to generate the bitmap included in the frame, an algorithm for determining bitmap locations by applying the indicated set of one or more CRC based hash functions to one or more service IDs of services desired by the apparatus, an algorithm for comparing the bitmap locations and the bitmap included in the frame, and instructions for associating with the other apparatus if the comparison indicates a probability that a service desired by the apparatus is known by the other apparatus or refraining from associating with the other apparatus if the comparison indicates the one or more services are not known by the other apparatus.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for generating a plurality of bitmaps that indicate one or more services known by the apparatus, each bitmap being generated by applying a different set of one or more CRC based hash functions to one or more service IDs of each service, instructions for generating one or more frames, each frame including one of the plurality of bitmaps and an indication of the set of one or more CRC based hash functions used to generate the bitmap included in the frame, and instructions for outputting the one or more frames for transmission. As another example, instructions for obtaining a frame from another apparatus, the frame including a bitmap that indicates one or more services known by the other apparatus and an indication of a set of one or more CRC based hash functions used to generate the bitmap included in the frame, instructions for determining bitmap locations by applying the indicated set of one or more CRC based hash functions to one or more service IDs of services desired by the apparatus, instructions for comparing the bitmap locations and the bitmap included in the frame, and instructions for deciding whether to associate with the other apparatus based on the comparison.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to:
        generate a plurality of bitmaps that indicate one or more services known by the apparatus, each bitmap being generated by applying a different set of one or more cyclic redundancy check (CRC) based hash functions to one or more service identifications (IDs) of each service, and
        generate one or more frames, each frame including one of the plurality of bitmaps and an indication of the set of one or more CRC based hash functions used to generate the bitmap included in the frame; and
    an interface configured to output the one or more frames for transmission.

2. The apparatus of claim 1, wherein at least one of: a number of bits associated with the plurality of bitmaps, a number of the plurality of bitmaps, or a number of CRC based hash functions in each set is selected based on a desired probability of providing a false positive indication that a particular one of the one or more services is known by the apparatus.

3. The apparatus of claim 1, wherein the one or more frames comprise at least one of: a beacon frame, a probe response frame, a broadcast frame, or a generic advertisement service (GAS) frame.

4. The apparatus of claim 1, wherein the one or more frames are output for transmission as part of a pre-association discovery (PAD) protocol.

5. The apparatus of claim 1, wherein the generation of the one or more frames comprises generating frames by cycling through different ones of the plurality of bitmaps to include in the one or more frames.

6. The apparatus of claim 1, wherein the processing system is configured to:
    analyze a distribution of locations of bits in at least some of the plurality of bitmaps; and
    select the bitmap to include in at least some of the one or more frames based on the analysis.

7. The apparatus of claim 1, wherein each set of one or more CRC based hash functions comprises at least four CRC based hash functions.

8. The apparatus of claim 1, further comprising a transmitter for transmitting the one or more frames, wherein the apparatus is configured as an access point.

9. An apparatus for wireless communications, comprising:
an interface configured to obtain a frame from another apparatus, the frame including a bitmap that indicates one or more services known by the other apparatus and an indication of a set of one or more cyclic redundancy check (CRC) based hash functions used to generate the bitmap included in the frame; and
a processing system configured to:
determine bitmap locations by applying the indicated set of one or more CRC based hash functions to one or more service identifications (IDs) of services desired by the apparatus,
compare the determined bitmap locations and bitmap locations of the bitmap included in the frame, and
associate with the other apparatus if the comparison indicates a probability that a service desired by the apparatus is known by the other apparatus or refrain from associating with the other apparatus if the comparison indicates the one or more services are not known by the other apparatus.

10. The apparatus of claim 9, wherein the frame is obtained as part of a pre-association discovery (PAD) protocol.

11. The apparatus of claim 9, wherein each set of one or more CRC based hash functions comprises at least four CRC based hash functions.

12. The apparatus of claim 9, further comprising a receiver for receiving the frame from the other apparatus, wherein the apparatus is configured as an access terminal.

13. A method for wireless communications by an apparatus, comprising:
generating a plurality of bitmaps that indicate one or more services known by the apparatus, each bitmap being generated by applying a different set of one or more cyclic redundancy check (CRC) based hash functions to one or more service identifications (IDs) of each service;
generating one or more frames, each frame including one of the plurality of bitmaps and an indication of the set of one or more CRC based hash functions used to generate the bitmap included in the frame; and
outputting the one or more frames for transmission.

14. The method of claim 13, wherein at least one of: a number of bits associated with the plurality of bitmaps, a number of the plurality of bitmaps, or a number of CRC based hash functions in each set is selected based on a desired probability of providing a false positive indication that a particular one of the one or more services is known by the apparatus.

15. The method of claim 13, wherein the one or more frames comprise at least one of: a beacon frame, a probe response frame, a broadcast frame, or a generic advertisement service (GAS) frame.

16. The method of claim 13, wherein the one or more frames are output for transmission as part of a pre-association discovery (PAD) protocol.

17. The method of claim 13, wherein the generation of the one or more frames comprises generating frames by cycling through different ones of the plurality of bitmaps to include in the one or more frames.

18. The method of claim 13, further comprising:
analyzing a distribution of locations of bits in at least some of the plurality of bitmaps; and
selecting the bitmap to include in at least some of the one or more frames based on the analysis.

19. The method of claim 13, wherein each set of one or more CRC based hash functions comprises at least four CRC based hash functions.

20. A method for wireless communications by an apparatus, comprising:
obtaining a frame from another apparatus, the frame including a bitmap that indicates one or more services known by the other apparatus and an indication of a set of one or more cyclic redundancy check (CRC) based hash functions used to generate the bitmap included in the frame;
determining bitmap locations by applying the indicated set of one or more CRC based hash functions to one or more service identifications (IDs) of services desired by the apparatus;
comparing the determined bitmap locations and bitmap locations of the bitmap included in the frame, and
associating with the other apparatus if the comparison indicates a probability that a service desired by the apparatus is known by the other apparatus or refraining from associating with the other apparatus if the comparison indicates the one or more services are not known by the other apparatus.

* * * * *